United States Patent [19]

Wyman

[11] 4,298,473

[45] Nov. 3, 1981

[54] DRUM FILTER APPARATUS

[75] Inventor: Floyd H. Wyman, Mauldin, S.C.

[73] Assignee: Marshall and Williams Company, Greenville, S.C.

[21] Appl. No.: 150,323

[22] Filed: May 16, 1980

Related U.S. Application Data

[63] Continuation-in-part of Ser. No. 923,706, Jul. 11, 1978, Pat. No. 4,224,166.

[51] Int. Cl.³ .............................................. B01D 33/10
[52] U.S. Cl. ................................... 210/213; 210/214; 210/396; 210/403
[58] Field of Search ............... 210/391, 393, 396, 402, 210/403, 398, 399, 161, 162, 213, 214, 210, 413; 277/12

[56] References Cited

U.S. PATENT DOCUMENTS

| | | | |
|---|---|---|---|
| 1,594,999 | 8/1926 | Carter | 210/403 |
| 2,426,851 | 9/1947 | Winston | 210/213 |
| 3,779,911 | 12/1973 | Freudenthal et al. | 210/213 |
| 4,140,629 | 2/1979 | Martindale | 210/403 |
| 4,162,978 | 7/1979 | Lidman et al. | 210/213 |

Primary Examiner—Benoit Castel
Attorney, Agent, or Firm—Bailey, Dority & Flint

[57] ABSTRACT

A filter for removing solids from a liquid of the type wherein a rotatable basket or drum has media inside straining from inside out. A power operated conveyor is mounted in the drum above the axis of rotation for receiving and positively removing solids. Thus, a liquid level is possible above the axis of rotation but below the conveyor so that a large filter area is in contact with the liquid while not interfering with the operation of the conveyor. A retractable scoop is provided for positively delivering the solids to the conveyor with an alternate sealing arrangement. A discharge ramp is carried adjacent an end of a baffle which extends above a liquid inlet upwardly toward the conveyor and is spaced from an inner wall of the drum to collect solids therebetween and accommodate the scoop for their removal. An improved means for equalizing the distribution of the liquid within the drum is also provided.

8 Claims, 9 Drawing Figures

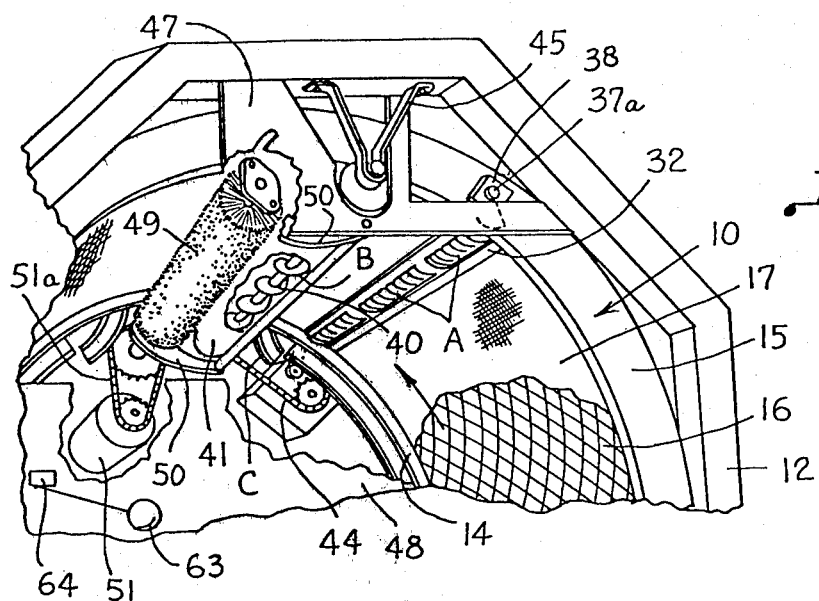
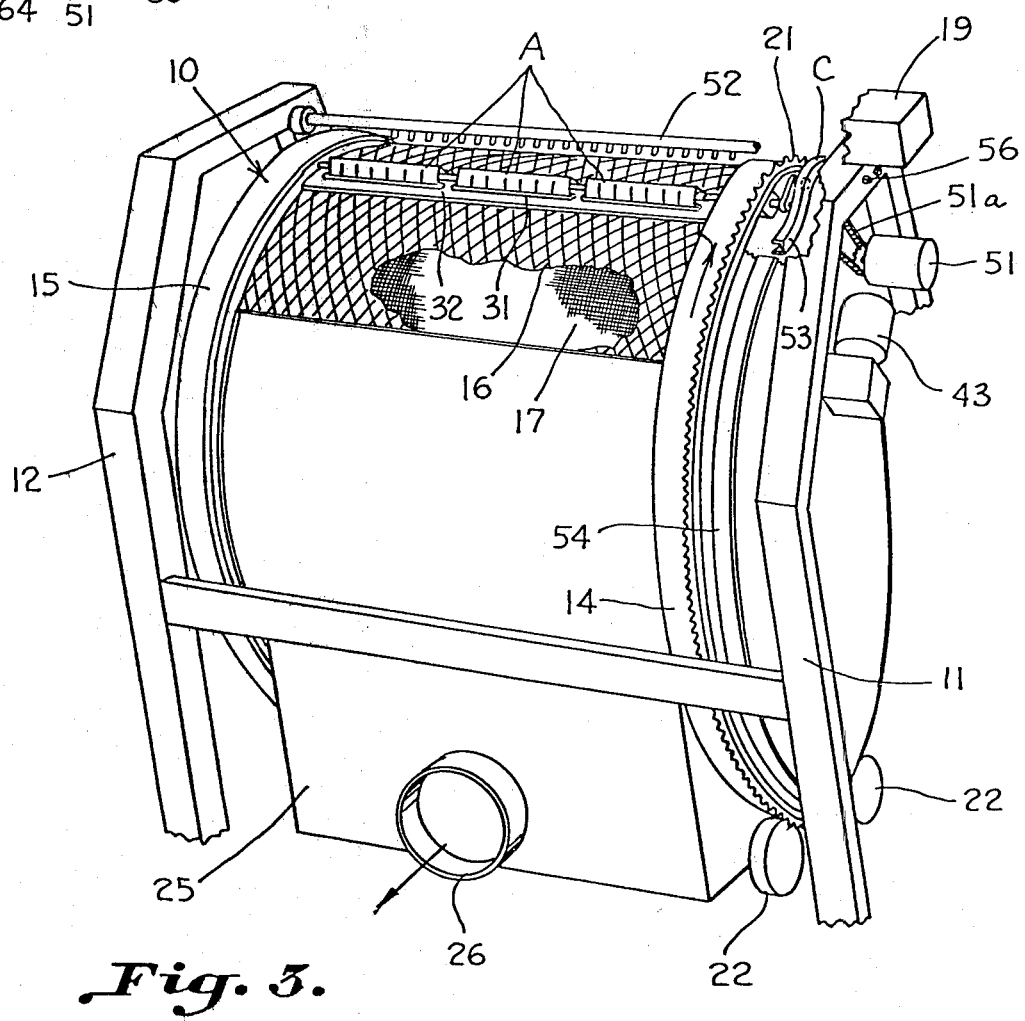

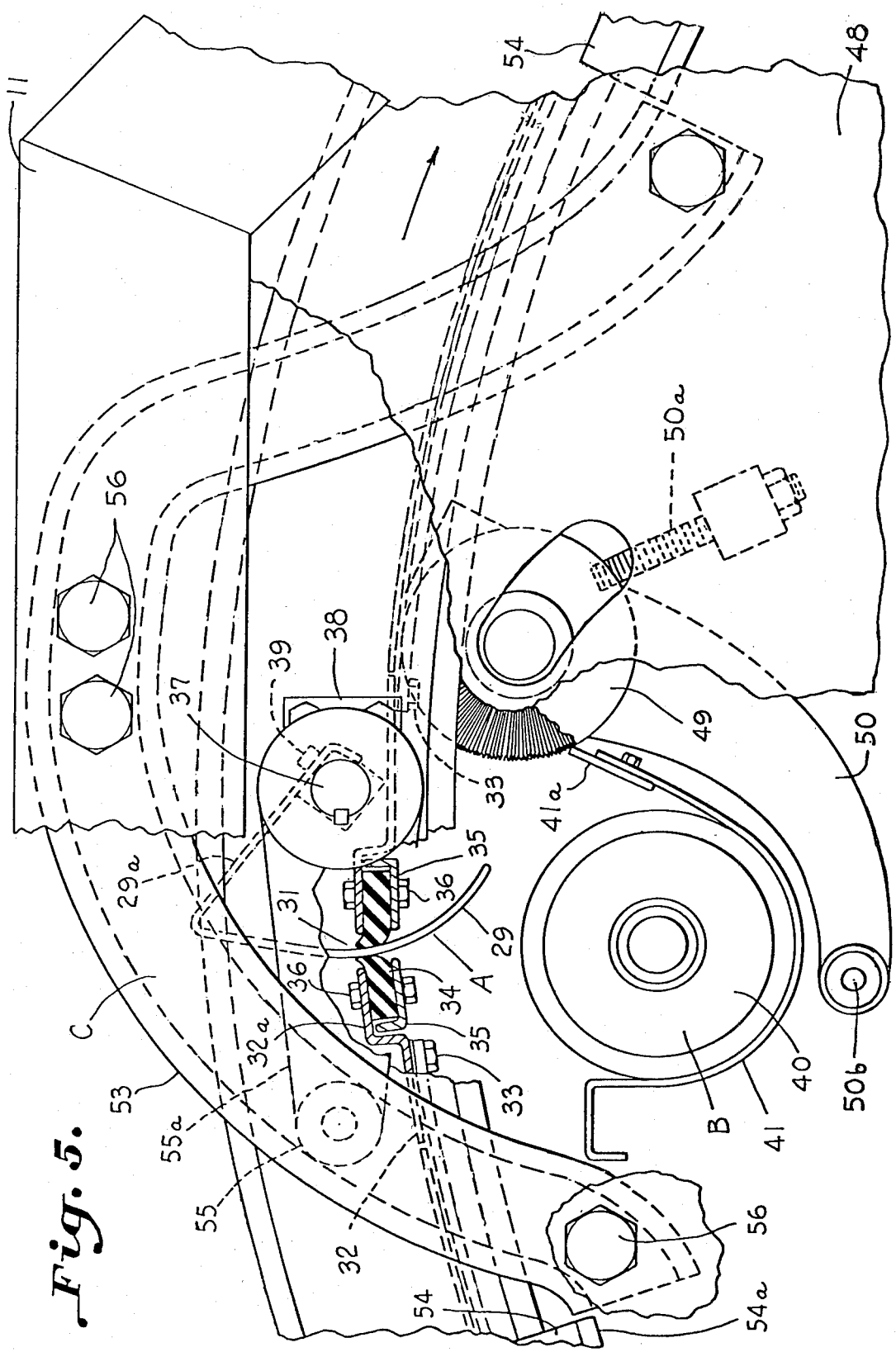

DRUM FILTER APPARATUS

This is a continuation-in-part of my co-pending application, Ser. No. 923,706, filed July 11, 1978, entitled DRUM FILTER AND METHOD now U.S. Pat. No. 4,224,166.

This invention relates to apparatus for removing solid foreign materials from liquids and more particularly for removing floating, sinking, suspended solids and semi-solids or slime from liquids.

BACKGROUND OF THE INVENTION

More particularly, this invention relates to liquid filters employing the principle of screening liquid by passing it through a filter medium as the liquid flows from the inside of a rotating drum to the outside of the drum. These filters usually handle only those solids and slimes which cling to the filter medium and allow the rotating filter to lift the solids out of the liquid. As the filter clinging solids reach the top of the drum, they are back-washed into a trough for disposal in a semi-solid state. Non-clinging solids drop to and remain in the bottom of the rotating drum.

The present machine not only removes the solids clinging to the rotating drum filter, but also removes the solids, which sink to the bottom of the drum, by means of a scoop hinged to the outside of the drum and extending into the drum in pick-up position. As the scoop, rotating with the drum, nears the surface of the liquid in the upper part of the drum, it picks up the material tending to float to the top of the liquid and dumps it into a longitudinal conveyor.

In addition to filters presently in use, of the type described above wherein a pan catches water and solids from back-washing, relevant prior art includes U.S. Pat. No. 2,758,722. The filter disclosed in this patent makes use of a plurality of circumferentially spaced fixed scoops in a lower corner of the inclined drum. No provision is made for cleaning scoops and scoop cavities. Material can easily build up in the scoop cavities to the point where they are filled and useless.

The embodiment of the present invention illustrated herein, a single line of scoops composed of a plurality of shorter scoops is shown but more could be utilized if needed. Each scoop has a gap between respective ends of the scoops. All scoops in one line are mounted on the same shaft and move together. These scoops are cleaned by withdrawing them through a seal of rubbery material each time the scoops are retracted. There are no longer any scoop cavities when the scoop is withdrawn from the filter area. This allows the brush to clean the area where the cavities were defined by the scoops.

Since the scoops of the aforesaid patent are fixed in place, the scraper cannot extend into the scoop area. Therefore, the adjacent end portion of the filter will become blinded and useless. No provision is made for controlled scoop drainage. It is very important that provision be made to control drainage of the scoops between the time they start to emerge from the liquid and the time they start to dump. If the scoops are not drained before they dump, liquid will be dumped into the conveyor. If drainage is not controlled, both the floating and sinking material may wash back out of the scoops as they emerge from the liquid. Control plates at the ends of the scoops illustrated herein are provided. These serve both to control drainage and to control current when submerged. The device of the patent design allows only a shallow pool of liquid in the bottom of the drum. This greatly limits the capacity of the filter. The filter of the present invention operates almost full. This gives an almost ideal head pressure and much more active filtering area. Moreover, a scraper would trowel or smear many materials into the media as when used in a poultry processing plant.

United States Letters Patent No. 1,531,482 illustrates a filter used as a paper making machine utilizing a brush and axially aligned screw conveyor. There is no provision for maximizing the area of filter media utilized and no scoop concept is employed.

It is desirable to collect solids adjacent an inner surface of the drum on each side thereof to facilitate scooping of solids and to provide a discharge ramp to facilitate dumping the solids into the upper conveyor carried within the drum.

SUMMARY OF THE INVENTION

It has been found that a vastly improved filter of increased capacity and versatility may be provided employing a rotating drum which filters from inside out wherein a power operated conveyor, aligned with the axis of rotation but positioned thereabove, positively removes solids separated from the liquid from the drum. A retractable scoop having spaced fingers to promote drainage, discharges the solids by gravity into the conveyor. A positive seal for the scoop when inserted into the drum in operable scooping position is provided by including above opposed wiping gaskets or seals, a receptacle having converging sides for receiving a resilient strip position on each side of the scoop.

A baffle has been provided extending above a liquid inlet within the drum upwardly toward one side of the drum for carrying at its free end a discharge ramp which is spaced and extends arcuately adjacent an inner surface of the drum toward the conveyor for collecting solids. Beneath the discharge ramp is carried an overflow weir and discharge pipe which extends above the surface of the liquid within the drum and which carries spray means for directing a spray at an angle across the liquid for causing solids to collect adjacent an inner surface of the drum opposite the discharge ramp. The liquid inlet is provided with an improved distribution system wherein a converging pipe, slotted therealong is provided with a stationary screw and the like for imparting a swirling action entering the liquid. When the water is forced through the screw in an axial direction, a rotating or swirling action is imparted to the water. If it were not for the screw, water entering the distribution pipe at high velocity would all try to rush to the far end because of its inertia. The swirling action generates a centrifugal force where the water tries to escape radially from the pipe. By controlling the slot width a uniform amount of water can be "peeled off" along the entire length of the distribution pipe.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 3 is a perspective view looking from an opposite end of the filter illustrating the drive for the rotating drum with tank and outlet for filtered liquid cradle mounting for the drum, and scoop operating means, FIG. 4 is an enlarged perspective view looking toward the upper left hand end of FIG. 3 with head removed, illustrating scoop and conveyor and brush mountings with drives therefor as well as liquid level control means, FIG. 5 is an enlarged end elevation looking toward the right hand end of FIG. 3, with parts omitted and parts in section, illustrating scoop, conveyor and brush mountings.

DESCRIPTION OF A PREFERRED EMBODIMENT

Figure 1:
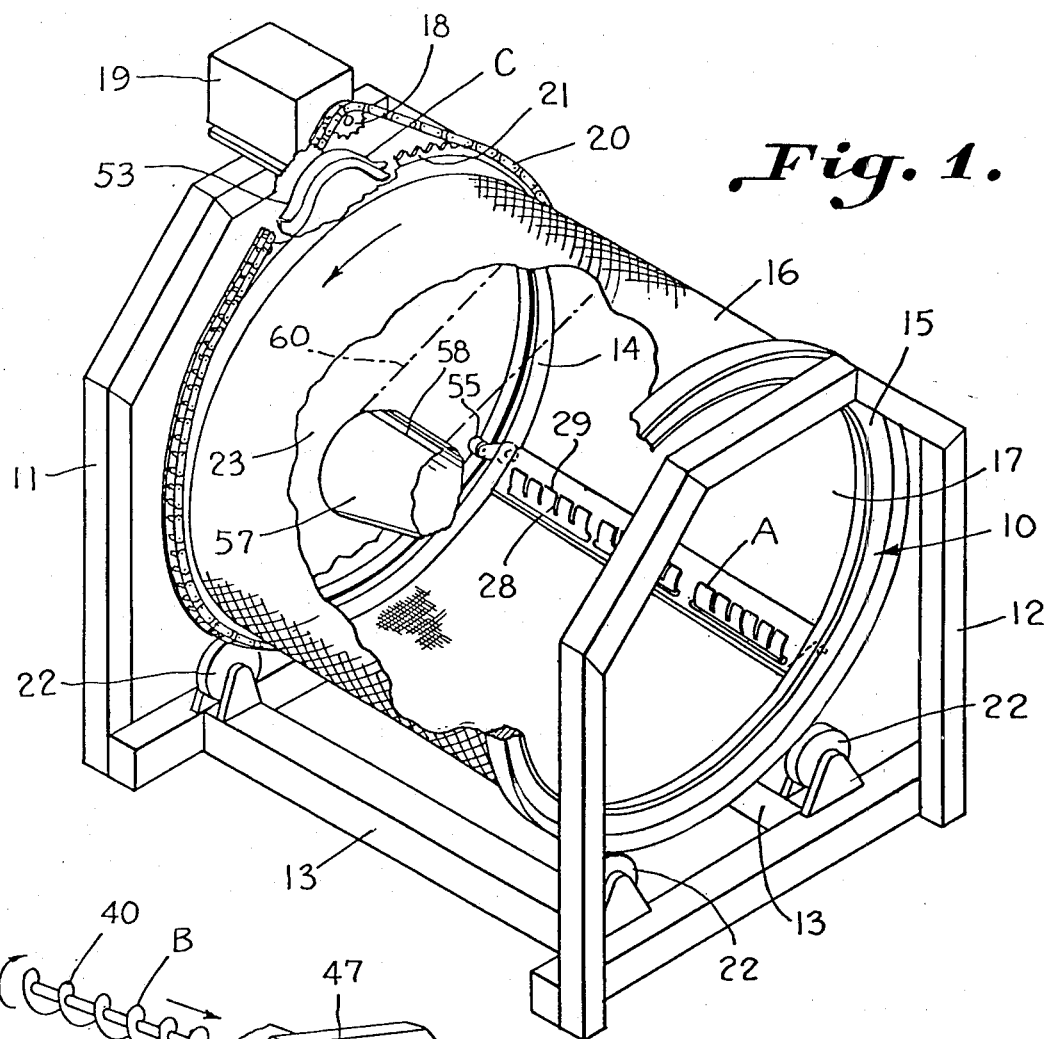
FIG. 1 is a perspective view illustrating a rotating drum filter constructed in accordance with the present invention, with parts omitted and parts broken away to show the scoops and operating mechanism therefor at the inlet end of the filter.

The drawing illustrates a rotating drum filter having liquid filter media carried internally of the drum conforming thereto for retaining solids while the filtered liquid passes therethrough. The improvement contemplates a scoop A extending within the drum for collecting solids from the liquid in the drum and carrying the solids upwardly from the liquid. Conveyor means B comprising a screw is carried above the axis of rotation and above the liquid for removing solids from the drum. Other means of conveying such as a belt conveyor, drag chain, vibrating conveyor, etc. could be substituted for the screw conveyor. Means C comprising a cam is provided as a suitable means for retracting the scoop for discharging solids collected thereby into the transverse conveyor means for removal from the drum but any other suitable means could be employed.

The filter illustrated in the drawings has an elongated basket or drum broadly designated at 10, carried for rotation within an elongated frame. The frame has vertical end members 11 and 12 joined by spaced longitudinal supports 13. The drum 10 has flanged end rims 14 and 15 joined by an expanded metal midsection 16 which has large openings therein, but which is suitable for supporting screen type filter media 17 on the inside thereof. The filter media is preferably of the permanent variety such as stainless steel, which may range in porosity from coarse to fine. The drum is turned by a sprocket 18 which serves as a power takeoff from the motor 19 to drive a chain 20. The chain 20 is passed around a toothed driving portion 21, carried around the circumference of the drum adjacent the flanged end rim member 14. In order to facilitate rotation of the basket or drum, spaced idler wheels 22 are carried adjacent each inside corner of the frame forming a cradle drive member.

Figure 6:
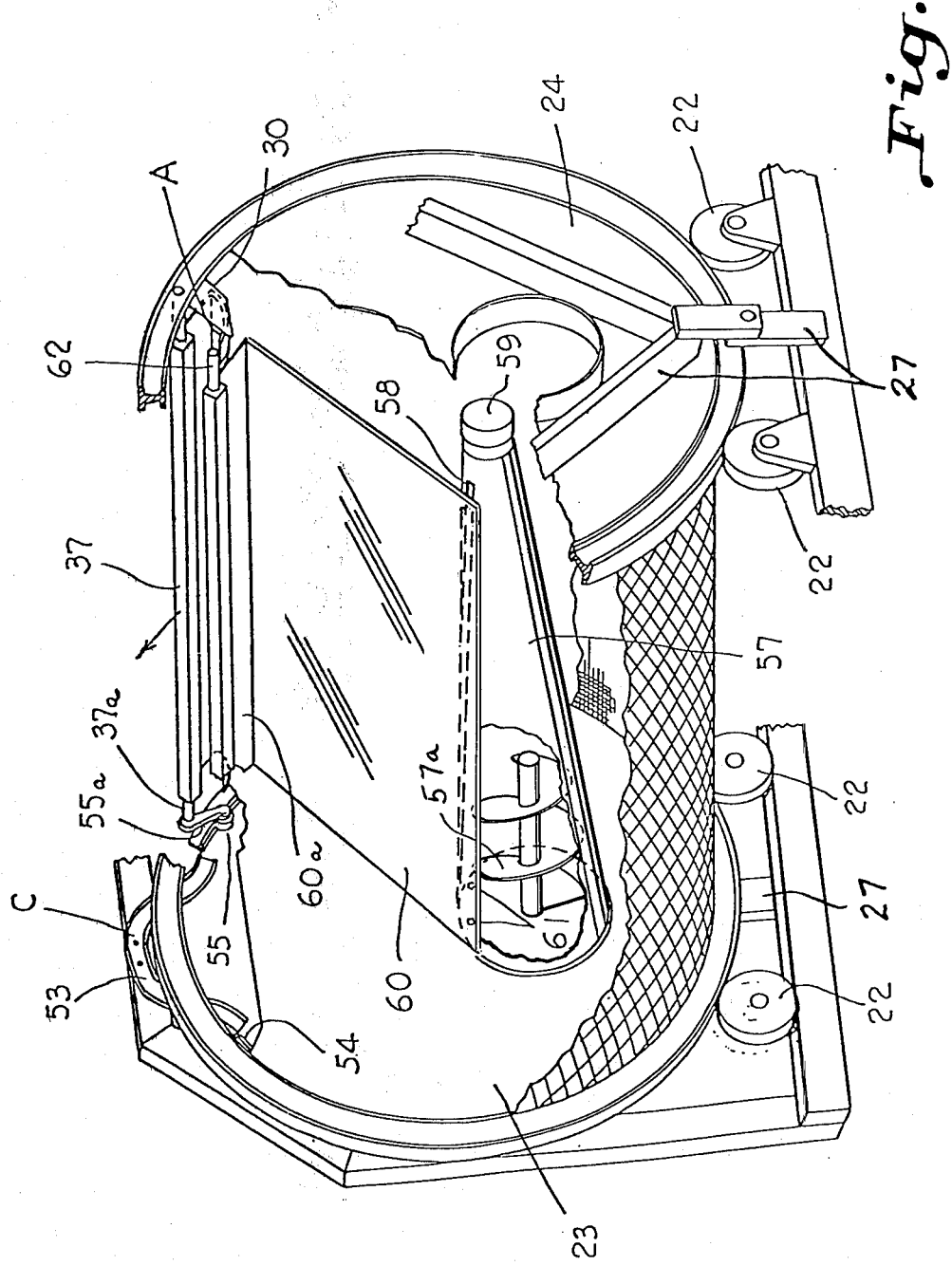
FIG. 6 is a perspective view illustrating inlet distributor pipe, baffles and scoop arrangement for collecting floating solids such as lint in a textile filtering operation.

Referring especially to FIGS. 1 and 6, it will be noted that the end member 14 of the drum carries a head end closure 23. By reference to FIG. 2, it will be noted that a head 24 is suitably provided at the opposite end of the drame adjacent the vertical support 12. The opposed heads 23 and 24 providing sealing engagement with the respective end rim members 14 and 15. The drum 10 is carried to deliver filtered liquid to a tank 25 which has an outlet 26. If desired, the liquid may simply flow through an open bottom in the tank or be otherwise handled after it passes through the media 17 carried within the drum. The head 24 is provided with a cover 26 for an opening through which access may be had to the interior of the drum. A stationary Y-shaped support is illustrated at 27 in FIGS. 2 and 6 fixed to the fixed closures 23 and 24.

The scoop A is retractable and includes a plurality of spaced slotted sections. The slots 28 define finger portions 29 which curve arcuately inwardly forming cavities and the slots are provided for effecting rapid drainage of the scoop. The scoop may be provided with baffle end portions such as illustrated in FIG. 6 at 30. The scoop sections extend through spaced slots 31 (FIGS. 3 and 5) carried in a longitudinal support 32 carried by the drum exteriorly of the expanded metal portion. An opening is also defined within the internal filter 17 which is secured by longitudinally spaced bolts 33 on each side of the support 31. The support 31 has a cavity therein defined by upwardly extending bracket portions 32a which contain a suitable seal or gasket 34 formed of deformable rubbery material. The metal retaining strips 35 are provided with bolts 36 for securing the gaskets 34 within the opposed cavities formed by the bracket portions 32a. The scoop sections are fastened to an intermediate portion of the shaft 37 of square cross-section by a suitable fastening member 39. The fingers 29 are joined on one end as by a bracket portion 29a extending at an angle thereto for securement by the fastener 39. The fingers extend inwardly, preferably at an acute angle as illustrated, and thence extend arcuately inwardly forming a cavity between them and the media. The scoop is normally maintained in the position shown in FIGS. 1, 4 and 6 prior to being withdrawn, as is commencing in FIG. 5.

Figure 8:
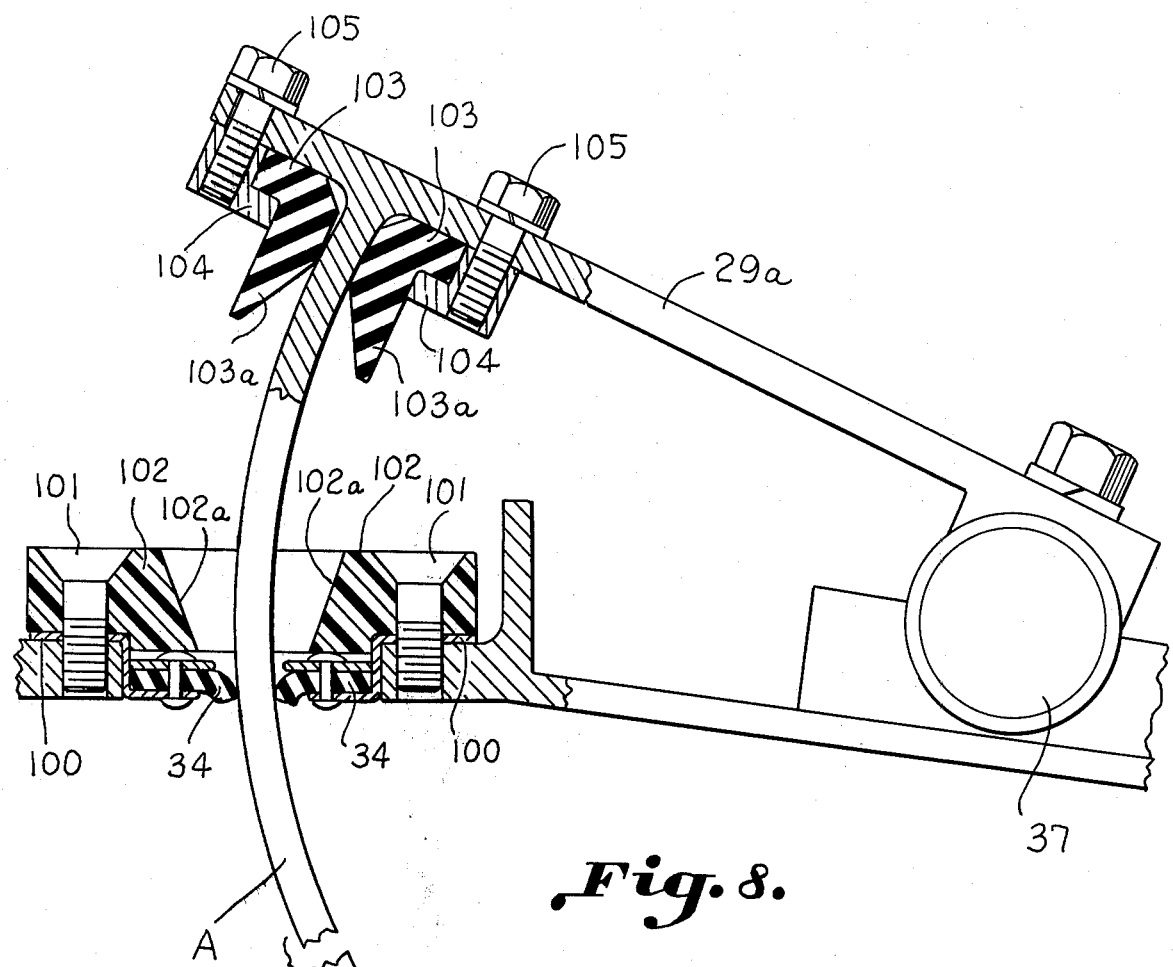
FIG. 8 is a transverse sectional elevation illustrating an alternate form of the seal illustrated in FIG. 5 showing the scoop in retracted position.
Figure 9:
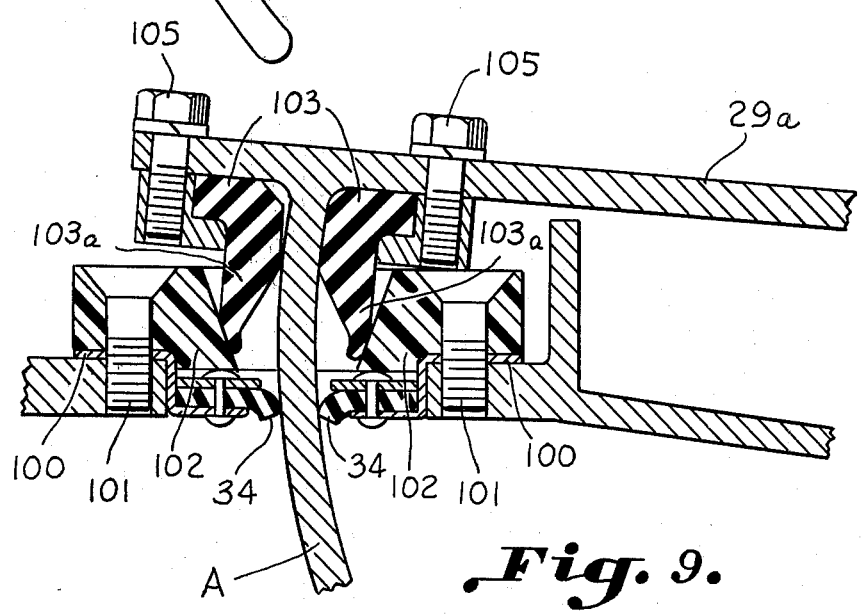
FIG. 9 is a transverse sectional elevation similar to FIG. 8 but showing the scoop in inserted operable position.

An alternate sealing arrangement which is removable from the outside is illustrated in FIGS. 8 and 9. The wiping seals or gaskets 34 are suitably fastened within bracket strips 100 on an inner end thereof. Screws 101 confine sealing members 102 to the bracket strips and, in turn, the entire assembly to the outside of slot forming portions of the filter drum. The scoop A has an inwardly projecting sealing strip 103 on each side thereof adjacent the bracket portion 29a. The sealing strips 103 are clamped on one side as by brackets 104 and fastened by screws 105 to the bracket 29a. The strips 103 each have a tapering free end 103a for reception into deformed sealing engagement as shown in FIG. 9 with the tapering walls 102a of the receptacle formed by the strips 103. The screws 101 are removable for removing the assembly from the outside.

Figure 2:
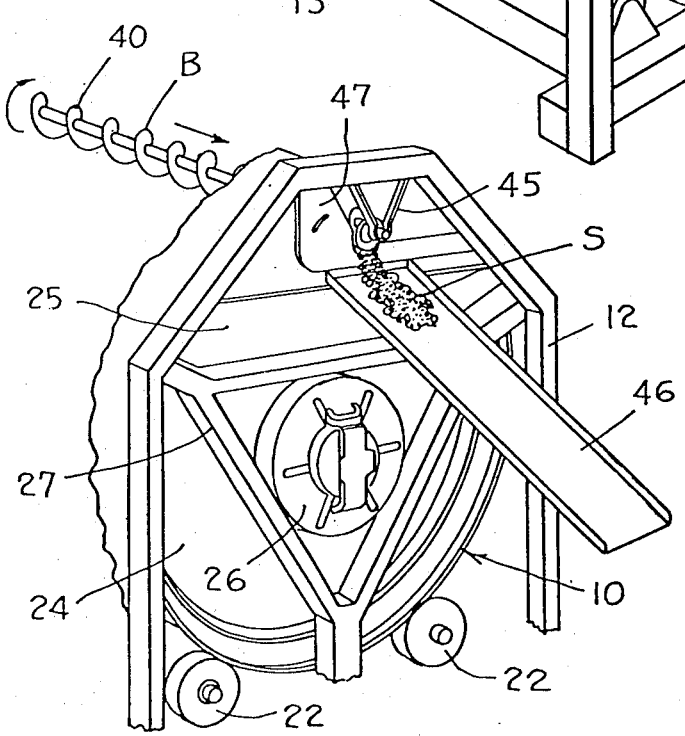
FIG. 2 is a similar perspective view, illustrating power operated conveyor means including a screw removing solids from the drum.

It is important that the scoop discharge any solids collected in the cavity thereof into the screw conveyor B which includes a screw member 40 carried in a trough 41. The screw is driven by a suitable motor 43 as through a chain drive 44. FIG. 2 illustrates the mounting of the screw 40 within depending brackets 45. The solid material S deposited from the scoop may be carried off from the delivery end of the screw within a suitable chute 46 illustrated in FIG. 2 or by other suitable means. A bracket 47 is provided at the discharge end of the screw conveyor while a similar bracket 48 is carried at the opposite end. The conveyor is followed by a brush 49 carried by suitable brackets 50 each pivoted on one end 50b on respective brackets 47 and 48, the position of which, with respect to the media, is adjustable by the threaded means 50a. The brush 49 is driven by a suitable motor 51 through a chain drive 51a. The trough 41 has a knife edge flicker bar 41a carried at one end of the brush in order to prevent a backspray of material clinging to the brush upon the filter media if desired.

Cam means C are provided for raising the scoop when passing over the conveyor B in order to dump the solids collected in the filter operation and includes a cam 53 and an angle 54 having a flange 54a for retaining the cam follower 55 therewithin. The flange 54a extends entirely about the filter except for that portion occupied by the camming section 53. The camming section 53 is connected as by bolts 56 to the end frame member 11. The cam follower 55 has a link 55a which has suitable fixed connection with the shaft 37 as by a shank portion 37a. After passing the brush, the cam means returns the scoop to its operative position extending within the drum to form cavities for collecting solids rejected by the filter media.

Referring now more particularly to FIGS. 1 and 6, it will be noted that a distribution pipe 57 is carried by the head 23 and serves as an inlet for bringing liquid to be filtered within the drum and for distributing the liquid through the drum through the slot 58 therein. A closed cap end is illustrated at 59. The taper is provided from the inlet end to the cap in order to distribute the liquid uniformly within the drum. The cap end is illustrated as being adjacent the head 24. A lateral and upwardly inclined baffle 60 is provided, above the slot for collecting solids therebeneath and is attached as by screw 61 to the distribution pipe 57 along one edge, whereas an opposite edge which has an angular extension 60a is suitably secured to the conveyor trough. The floating solids move upwardly along the underside of the baffle for collection by the scoop as it passes the upper end of the baffle.

On installations where water enters the filter at a high velocity, most of the flow comes out of the small end of distribution pipe 57 in spite of the taper. A short section of screw conveyor 57a is placed as shown in the entrance end of the pipe to make the water stream spin or whirl around. The centrifugal force makes water come out of the slot at the entrance end as well as entire length. This is controlled by the slot width.

A float 63 is provided for actuating a switch 64 for controlling the liquid within the filter at a predetermined level. The filter starts only when the screen has blinded to the point where more clean screen is needed to handle the incoming flow. As soon as enough clean screen has rotated below water level to handle this flow the float drops and stops the filter. Thus, when using the float switch control the filter will turn on and off as is needed. Alternate means of controlling the filter may, of course, be employed. Examples would be allowing a float, bubble tube or other level sensing device to control the speed of rotation so as to match incoming flow of liquid. Another common means of control is by use of timers.

Figure 7:
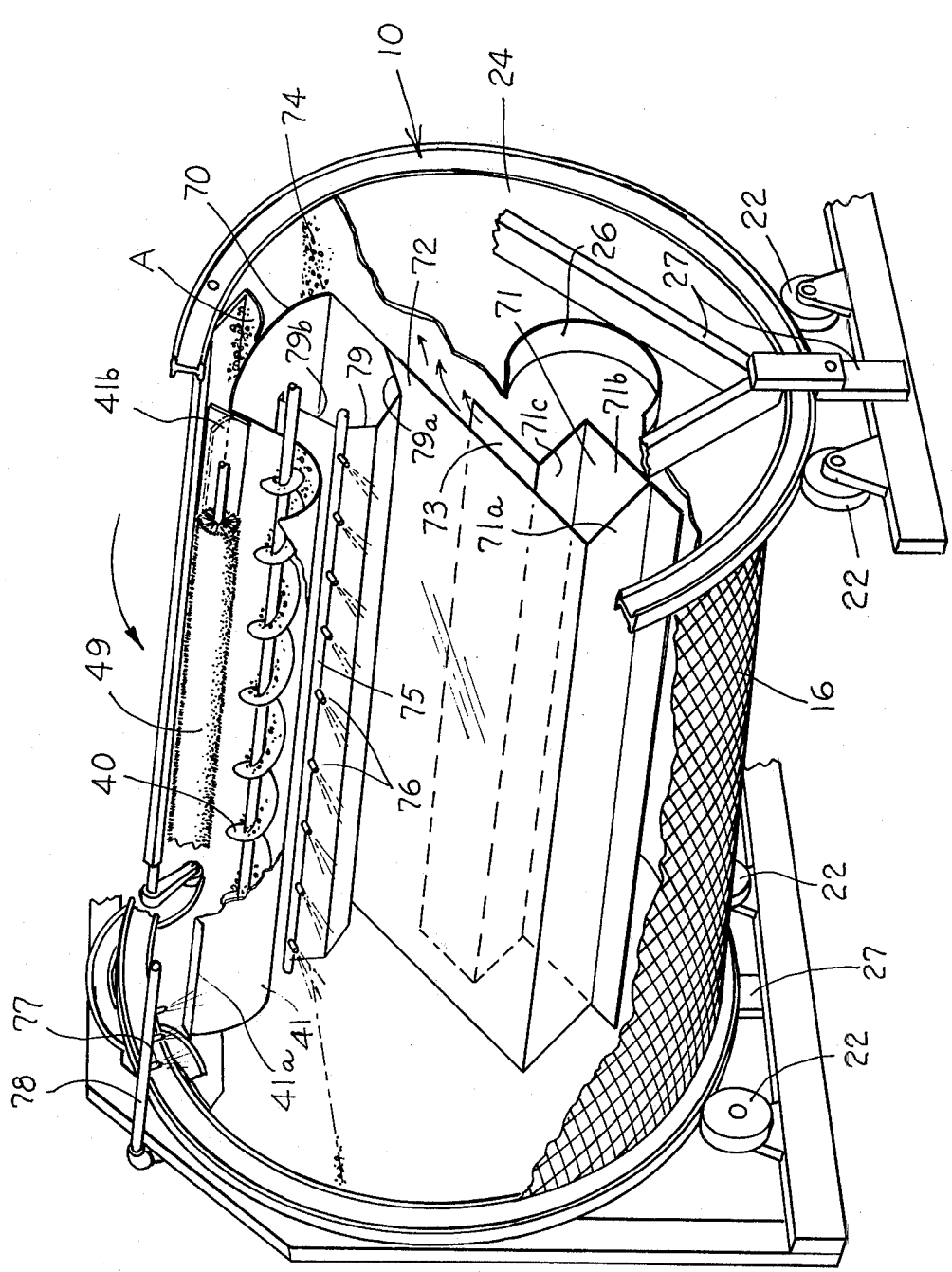
FIG. 7 is a perspective view similar to FIG. 6 illustrating an apparatus constructed in accordance with a modified form of the invention.

FIG. 7 illustrates a liquid filter similar to FIG. 6 wherein the scoops A are adapted to be closely accommodated within an arcuate space between a discharge ramp 70 and a filter media of the expanded metal. Like parts are designated by like reference characters used in FIGS. 1-6.

It will be observed that the drum, broadly designated at 10, is adapted to be rotated upon the rollers or idler wheels 22 carried at each end of the drum. The drum has stationary head members 24 carried by the stationary support 27 at each end thereof. The screw conveyor 40, provided with a brush 49, is carried within a suitable pan 41a. A rubber flap 41b extends above one end thereof to retain the solids deposited from the scoops A within the trough pan 41a. As the brush cleans solid material from the screen it will knock the heavier particles in an almost horizontal direction. These heavier particles may have enough velocity or inertia to carry them across the conveyor trough. The purpose of the rubber flap is to stop these heavy particles from flying out of the trough area. The inlet includes a uniform distribution manifold designated at 71 which includes a sheet metal member having adjacent sides 71a and 71b. Another side is formed by a baffle 72 which extends upwardly from a free end of the side 71a diagonally across the drum toward an inner surface of the drum for carrying the arcuate discharge ramp 70 on the free end.

The arcuate space defined between the discharge ramp 70 and the drum is such as to accommodate the scoop A with a close fit therein. Another side 71c of the inlet manifold has an upwardly directed baffle 73 extending parallel to the baffle 72 in spaced relation therebeneath to permit liquid to flow along the bottom of the baffle 72 to collect solids 74 between the discharge ramp and the inner surface of the drum to accommodate scooping thereof for delivery to the conveyor. Incoming water is directed upwardly toward the collection area between the discharge ramp and the drum for collecting floating material. Such material is confined in this area preparatory to scooping because, in order to escape, it would have to go down to the bottom and under the manifold. If there is more material than can be accommodated by the scoop, such will simply be pushed along the ramp to the conveyor.

A suitable pipe 75 carries water for spraying water through nozzles 76 across the surface of the liquid within the drum collecting solids adjacent an inner surface of the drum opposite the discharge ramp to also facilitate scooping of the solids on that side of the inner surface of the drum.

Suitable backspray nozzles 77 are carried by a pipe 78 for cleaning the drum after deposit of the solids from the scoops into the conveyor. An emergency overflow weir 79 includes an inwardly directed portion 79a extending from an upper surface of the baffle 72 adjacent the discharge ramp and thence upwardly presenting an upper wall 79b extending above the normal surface of the liquid to act as an emergency overflow pipe permitting the discharge of excess liquid through the opening in the stationary head opposite the filtered liquid outlet 26.

OPERATION

Sometimes when the mat or filter cake is unusually heavy or thick it will tend to separate and fall away from the filter screen in the almost horizontal area near the rubber flap. When this happens on a filter without the delivery ramp, the filter cake usually peels away from the screen all the way back down to the water level and may continue to peel as the drum rotates. When this separation from the screen occurs on a filter equipped with a delivery ramp, it can only fall as far as the ramp and peeling is not a problem. If the filter cake continues to separate from the screen, the material simply piles up on the delivery ramp until the scoop comes around. The scoop then pushes this material into the conveyor.

As stated above, prior filters are limited to use with those materials which can be made to cling to the filter medium, and they depend on the filter medium to lift this material out of the liquid so that it can be disposed of. Generally speaking this restricts them to those materials in suspension in the supporting liquid. Users of these filters usually depend on other devices to handle any materials which are heavy enough to sink to the bottom or light enough to rise to the surface of the liquid. Devices constructed in accordance with the present invention not only handle those materials which cling to the filter medium, but in addition, would handle both those materials which sink to the bottom and those materials which rise to the top and float. The scoop is hinge mounted to the outside of the drum and extends through the drum to the inside of the drum when it is in the pick-up position. As the scoop rotates with the drum, it picks up any material which has sunk to the bottom of the drum. As the scoop, rotating with the drum, emerges from the surface of the liquid, near the top of the drum, it also picks up those materials which are floating on the surfaces and which move toward one end of the liquid surface due to currents generated in the liquid by rotation of the drum, by the action of water from pipe 75 sprayed through nozzles 76 or by means of the baffle 60. These materials are then carried to the top of the drum where they are dumped into a screw conveyor.

Almost all of the inside surface of the filter drum is covered with a filter medium in a method similar to that employed by other internal drum filters in present use and maximum utilization is made thereof since the liquid may rise in normal operation above the axis of rotation. A rotating brush removes the material which is still clinging to the filter medium directly into the screw conveyor. The scoop retracts as it approaches the brush. This serves two purposes, i.e., it dumps the material into the screw conveyor and it enables the scoop to pass the brush. As soon as the scoop has rotated past the brush, it is returned to the pick-up position inside of the drum. To prevent leaks around the scoop, a molded elastomeric seal through the wedge action illustrated in FIG. 5, seals the area around the scoops in much the same manner as weather stripping seals around a door and wipes the scoop fingers clear. The slots in the scoop enable excess liquid to drain out as the scoop moves the liquid surface to the conveyor. This keeps excess liquid from being dumped into the conveyor.

While a preferred embodiment of the invention has been described using specific terms, such description is for illustrative purposes only, and it is to be understood that changes and variations may be made without departing from the spirit or scope of the following claims.

What is claimed is:

1. A liquid filter having a cylindrical horizontally disposed perforate drum for retaining solids therein while permitting filtered liquid to flow therethrough, having means supporting the drum for rotation about a horizontal axis, comprising:

a head member carried within said perforate drum at each end thereof stationary with respect to said perforate drum which rotates thereabout;
    a driven conveyor carried adjacent the top of and extending substantially the entire length of said drum above the horizontal axis;
    means removing solids retained within said drum and depositing them adjacent the top thereof by gravity onto said conveyor for removal through a head member above said horizontal axis:
    a distribution pipe carrying the liquid to be filtered through a head member;
    a baffle extending on one side thereof above a flow of liquid from said distribution pipe; and
    a discharge ramp carried adjacent an end of said baffle remote from said distributor pipe extending arcuately substantially in spaced relation to an inner surface of said drum above said conveyor;
    whereby said means removing solids removes such solids collected between said drum and said discharge ramp and deposits same onto said conveyor.

2. The structure set forth in claim 1 including spray means extending longitudinally of said drum for directing a spray of liquid directing solids toward said drum opposite said discharge ramp.

3. The structure set forth in claim 2 including an overflow discharge weir carried by said baffle extending upwardly behind said discharge ramp above a surface of liquid in said drum and supporting said spray means.

4. The structure set forth in claim 1 wherein said means removing solids includes a scoop extending longitudinally of said drum and transversely across said drum adjacent said discharge ramp.

5. A sealing assembly for a retractable scoop carried by a filter drum having means supporting the drum for rotation comprising:

a horizontally disposed perforate rotatable filter drum;
    a retractable scoop mounted on said drum;
    a pair of opposed brackets carried by the drum with the scoop therebetween;
    a wiping gasket carried by inner ends of said brackets engaging said scoop;
    a pair of opposed sealing strips carried by said brackets extending outwardly thereof defining a receptacle; and
    sealing means carried on each side of said scoop receivable in said receptacle.

6. The structure set forth in claim 5 wherein said receptacle includes inwardly converging sides, said sealing means includes free depending portions deformably received by said converging sides, and said brackets being secured to outside portions of said drum defining a slot therebetween from which said assembly may be removed from the outside.

7. A distribution apparatus for controlling the entry of liquid to be filtered into a drum filter including:

a horizontally disposed perforate rotatable filter drum;
    means supporting said drum for rotation;
    an elongated slotted pipe extending longitudinally along said drum for introducing liquid into said drum; and
    a stationary screw means adjacent an entrance end of said drum carried by said means supporting said drum imparting a swirling motion to said entering liquid.

8. The structure set forth in claim 7 wherein said pipe is tapered inwardly, and a baffle inclined upwardly on one side of said pipe across said drum.

* * * * *